United States Patent
Brunton

(10) Patent No.: US 12,299,785 B1
(45) Date of Patent: May 13, 2025

(54) SYSTEM AND METHOD FOR GENERATING AN ON-SCREEN CANVAS UTILIZING USER SELECTIONS OF PREVIOUSLY SUBMITTED ARTISTIC IMAGES

(71) Applicant: Terra Brunton, Lawrence, KS (US)

(72) Inventor: Terra Brunton, Lawrence, KS (US)

( * ) Notice: Subject to any disclaimer, the term of this patent is extended or adjusted under 35 U.S.C. 154(b) by 0 days.

(21) Appl. No.: 18/740,716

(22) Filed: Jun. 12, 2024

(51) Int. Cl.
  *G06T 11/20* (2006.01)
  *G06F 3/04842* (2022.01)
  *G06F 3/14* (2006.01)

(52) U.S. Cl.
  CPC ........ *G06T 11/203* (2013.01); *G06F 3/04842* (2013.01); *G06F 3/14* (2013.01)

(58) Field of Classification Search
  CPC ....... G06T 11/203; G06F 3/04842; G06F 3/14
  See application file for complete search history.

(56) References Cited

U.S. PATENT DOCUMENTS

| | | | |
|---|---|---|---|
| 6,137,498 A | 10/2000 | Silvers | |
| 6,532,312 B1 | 3/2003 | Corkran | |
| 9,141,255 B2 | 9/2015 | Stroomer et al. | |
| 9,251,169 B2 | 2/2016 | Smith | |
| 10,248,994 B2 | 4/2019 | Grosz et al. | |
| 2012/0189221 A1* | 7/2012 | Inada | G06F 3/14 382/240 |
| 2014/0204125 A1* | 7/2014 | Smith | G06F 16/50 345/641 |
| 2017/0344820 A1* | 11/2017 | Wshah | G06F 40/174 |

* cited by examiner

*Primary Examiner* — Chong Wu
(74) *Attorney, Agent, or Firm* — Dale J. Ream

(57) ABSTRACT

An on-screen canvas using user selections of artistic images for each of a plurality of independent content regions on an electronic display. A computing device having a display screen defines a plurality of independent content regions. The system also includes a database having a multi-dimensional array having numerical coordinates indicative of a mapping of the independent content regions and includes a plurality of graphical images associated with each content region. An input device such as a mouse enables a user to toggle through (i.e., by clicking the mouse) the plurality of images in each content region until a desired image is selected, after which the mouse is advanced to a next content region and a next image selection. This procedure may continue until the user has generated a digital canvas as artistic elements which may be saved, shared, or printed.

20 Claims, 5 Drawing Sheets

SYSTEM AND METHOD FOR GENERATING AN ON-SCREEN CANVAS UTILIZING USER SELECTIONS OF PREVIOUSLY SUBMITTED ARTISTIC IMAGES

BACKGROUND OF THE INVENTION

This invention relates generally to digital artwork and, more particularly, to a system and method for generating an on-screen canvas in which user selections of a plurality of graphical or artistic images results in a canvas that may be shared, printed, framed, or stored electronically.

For centuries, artists have turned to canvas as a fundamental medium for their creative expressions. The history of canvas as a surface for artwork dates back to ancient times, with evidence of its use in civilizations like the Egyptians and Greeks. Its popularity soared during the Renaissance, when artists like Leonardo da Vinci and Michelangelo utilized canvas to produce some of the most iconic masterpieces in history. The tactile nature of canvas, its texture, and its ability to absorb paint have made it a beloved substrate for artists across generations, embodying tradition and craftsmanship.

However, as technology continues to evolve, the limitations of canvas become increasingly apparent. In today's digital age, artists are exploring new mediums and tools to push the boundaries of their creativity. Digital platforms offer infinite possibilities, allowing artists to experiment with virtual canvases, multimedia formats, and interactive experiences. From digital painting software to virtual reality applications, technology enables artists to transcend the physical constraints of traditional canvas, opening doors to innovation and collaboration. While the allure of canvas persists, embracing technology expands the horizons of artistic expression, inviting artists to explore uncharted territories and redefine the very essence of art itself.

In today's digital age, the intersection of art and technology offers a plethora of opportunities for creative expression. One such avenue lies in the realm of computer software designed to facilitate the creation of digital canvases using pre-submitted artistic elements, swatches, geometric shapes, colors, lines, and other images. This software empowers artists with a versatile toolset that not only enhances their workflow but also expands the horizons of their artistic vision.

One of the most compelling aspects of such software is its ability to provide artists with a vast library of artistic resources at their fingertips. Gone are the days of painstakingly searching for the perfect reference image or meticulously hand-drawing intricate patterns. Instead, artists can access a rich repository of pre-submitted artistic elements, ranging from classic brush strokes to modern geometric shapes, instantly incorporating them into their digital canvases. This not only saves valuable time but also inspires experimentation and creativity by offering a diverse array of visual stimuli.

Furthermore, the flexibility afforded by digital canvas creation transcends the limitations of traditional artistic mediums. Artists can seamlessly blend and layer different elements, manipulate colors and textures with precision, and experiment with composition in real-time. Whether they seek to evoke the ethereal beauty of watercolors, the boldness of acrylics, or the intricacy of pencil sketches, the software provides the tools necessary to bring their artistic visions to life with unparalleled fidelity.

Moreover, the convenience of a digital canvas extends beyond the realm of creation to encompass sharing and preservation. Artists can effortlessly share their work electronically with a global audience and thereby transcending geographical boundaries and reaching new admirers. Additionally, digital canvases can be easily stored and archived, safeguarding them against the ravages of time and preserving them for future generations to appreciate.

Another notable advantage of digital canvas creation software is its adaptability to various output formats. Whether artists intend to print their creations for gallery exhibitions, frame them as decorative pieces, or use them in multimedia projects, the software ensures optimal compatibility and resolution, guaranteeing stunning results across diverse mediums.

Therefore, it would be desirable to have an on-screen canvas that defines a plurality of separate and distinct content regions, each of which includes a plurality of previously submitted graphical or artistic images through which a user may toggle such as by clicking an input device such as a mouse until a selection is made. Further, it would be desirable to have an on-screen canvas that is displayed and operable as a mobile app running on a consumer electronic device such as a laptop, desktop computer, tablet, smartphone or the like. In addition, it would be desirable to have an on-screen canvas that enables an artist to make selections of artistic expressions within each content region such that the plurality of spaced apart content regions form a transformed artistic "work of authorship" that may be printed, framed, shared, or stored electronically.

SUMMARY OF THE INVENTION

This invention is directed to a system and method for generating an on-screen canvas using user selections of graphical or artistic images that are provided for each of a plurality of independent content regions on an electronic display screen. The system may include a computing device having a display screen that includes a graphical user interface (GUI) configured to define a plurality of independent content regions arranged thereon. The system may include a database stored in a non-volatile memory having a multi-dimensional array that includes a plurality of numerical coordinates indicative of a mapping of the independent content regions and includes a plurality of graphical images associated with each content region, respectively. The system includes an input device such as a mouse that enables a user to toggle through the plurality of images (i.e., by clicking the mouse) in each content region until a desired image is selected, after which the mouse is advanced to a next content region and a next image selection. This procedure may continue until the user has generated a digital canvas which may be saved, shared, or printed.

Therefore, a general object of this invention is to provide a system and method for generating an on-screen canvas on which a user (a.k.a. a digital painter/artist) is able to make a multiplicity of selections of a predetermined library of artistic styles, brush strokes, lines, and other artistic objects until the canvas has been fully prepared after which time it may be printed, framed, shared, or stored electronically.

Another object of this invention is to provide a system and method for generating an on-screen canvas, as aforesaid, that generates a display screen having a plurality of independent content regions, each of which includes a plurality of pre-submitted artistic "objects" through which a user may toggle (via clicking a mouse) until a desired image is selected.

Still another object of this invention is to provide a system and method for generating an on-screen canvas, as aforesaid, that enables an artist to generate on-screen artwork suitable for printing, sharing, framing, or storing.

Other objects and advantages of the present invention will become apparent from the following description taken in connection with the accompanying drawings, wherein is set forth by way of illustration and example, embodiments of this invention.

DESCRIPTION OF THE PREFERRED EMBODIMENT

Figure 1:
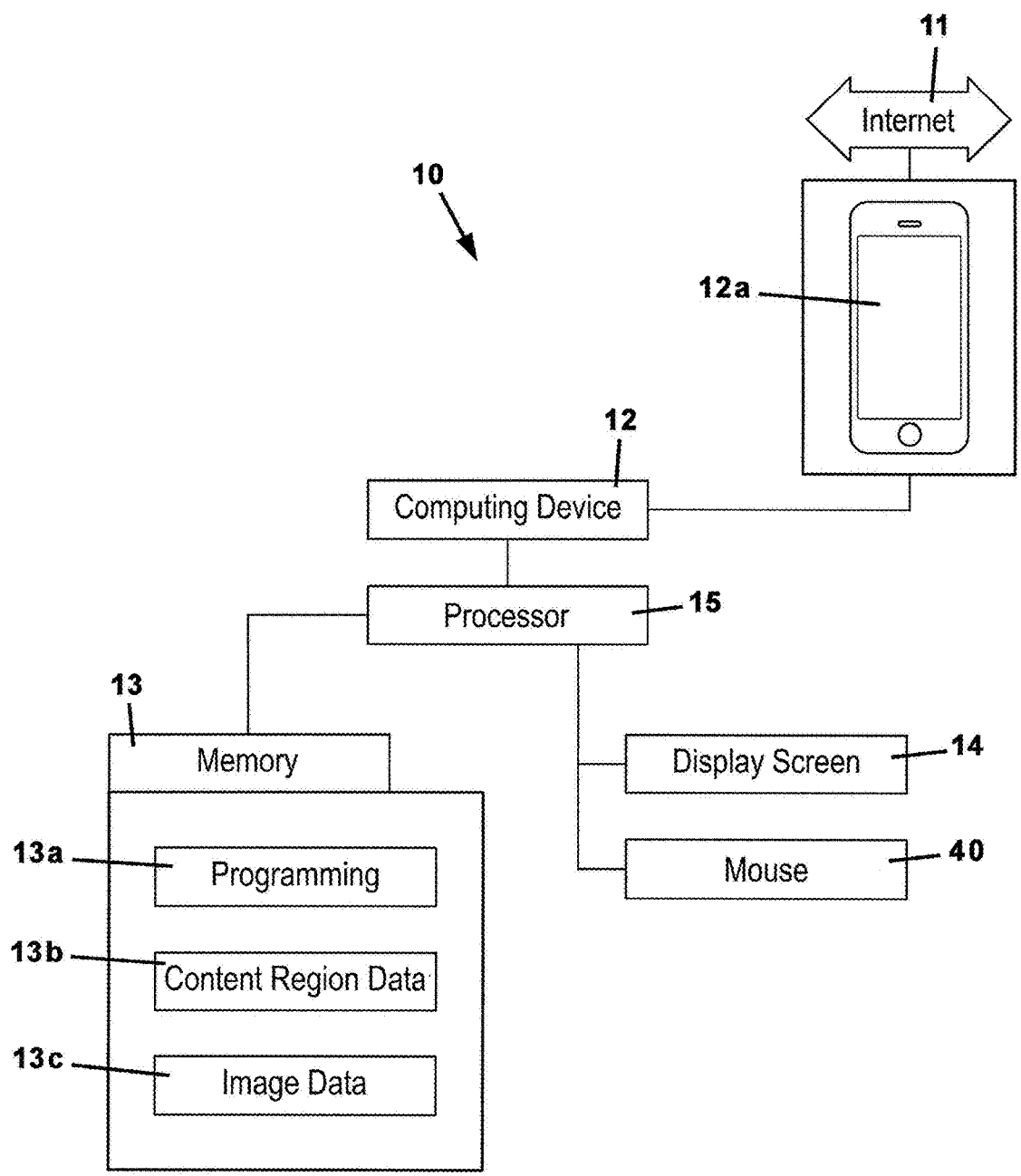
FIG. 1 is a block diagram illustrating a system and method for generating an on-screen canvas according to a preferred embodiment of the present invention.
Figure 2A:
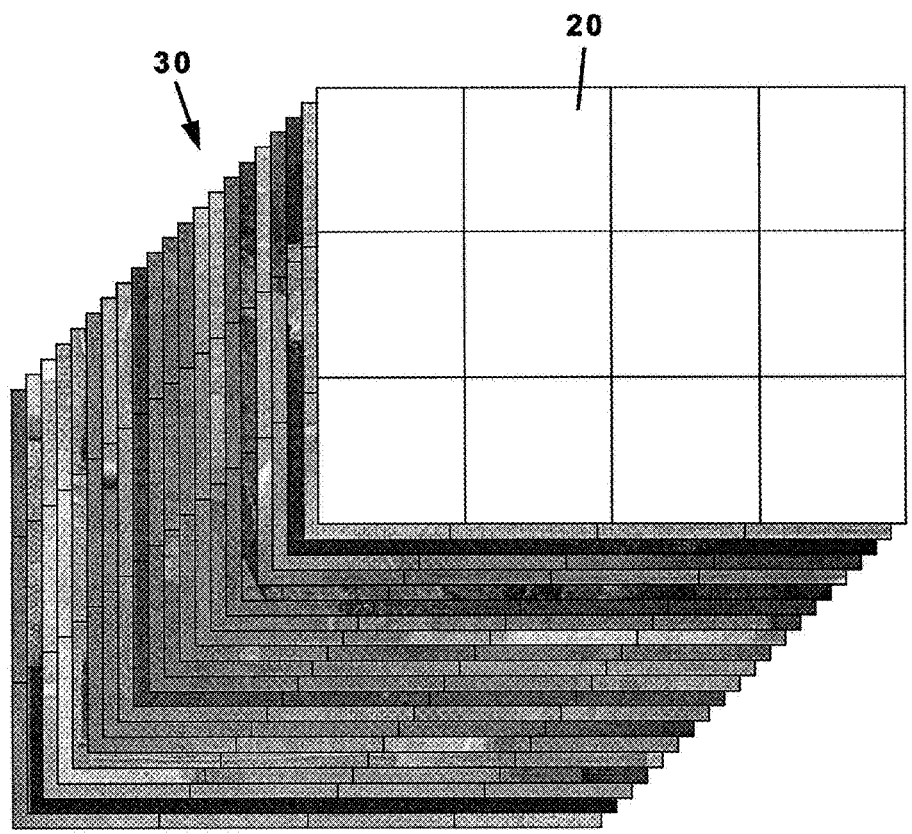
FIG. 2a is a diagrammatic view of the system and method as in FIG. 1, illustrating the plurality of unselected cells and the plurality of cell images available for selection in correspondence with each initial cell, respectively.
Figure 2B:
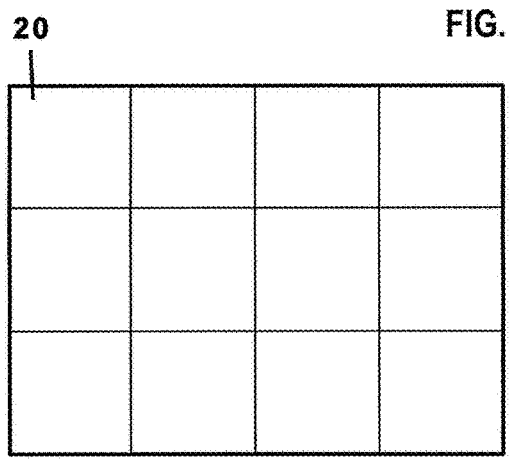
FIG. 2b is an isolated view of the plurality of unselected cells of a virtual canvas according to the present invention.
Figure 2C:
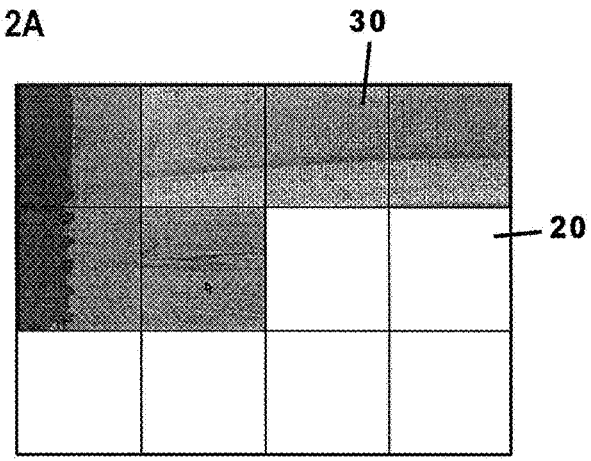
FIG. 2c is a two-dimensional view of the virtual canvas, illustrated with only a portion of the available cells having been actuated with a selected image.

A system and method for generating an on-screen canvas that enables user selection of a plurality of artistic images to be displayed at selected independent content regions according to a preferred embodiment of the present invention will now be described with reference to the accompanying drawings. The system 10 includes a computing device 12 that includes a graphical user interface (GUI) to generate a plurality of separate and distinct content regions 20 on a display screen 14. The system 10 includes a plurality of graphical or artistic images 30 that are associated with each content region 20 and from which a user may browse, toggle, and select a respective image using an input device such as a mouse 40 until the on-screen canvas is transformed into the user-selected combination of images which may then be printed, shared, framed, or stored.

The system 10 for generating an on-screen canvas may include computer software in the form of a software application (sometimes referred to as a mobile app or simply as an app) that may be downloaded, installed, and run on a computing device 12 such as a laptop, desktop computer, workstation, smart phone 12a, tablet, or the like. Alternatively, the system 10 may be implemented using hard-wired electronics rather than as software, especially if speed or durability is required. Further, the system 10 may include a display screen 14 on which text and graphics may be published according to the present invention. In an embodiment, the mobile app for creation of an on-screen canvas may be accessed via the Internet 11.

More particularly, the computing device 12 may include a non-volatile memory 13 that is configured to store programming instructions 13a (referred to as "programming") as well as data such as screen coordinates that provide a mapping of a plurality of content regions 20 (e.g., data indicative of locations on a computer screen), graphical and artistic image data, user selection data that is indicative of a respective content region and a selected image corresponding to the respective content region 20. It will be understood that the processor 15 in conjunction with programming instructions and a mapping of the display screen 14 may divide or arrange the screen into 4, 8, 16, 48, or 64 content regions or even other or additional configurations. More particularly, each contact region 20 may be represented numerically (as an on-screen location). The identification and numerical data may be stored collectively as content region data 13b in memory 13.

Preferably, the computing device 12 may include a processor 15 or controller that is configured or has been programmed to access the memory 13 according to instructions corresponding to an on-board operating system or the programming instructions executing the mobile app. The processor 15 is configured to make certain determinations based on other data and user selections and to actuate the display screen 14.

Even more particularly, the system 10 may include a database stored in the memory 13 having a multi-dimensional array that is configured to store and manage a plurality of numerical coordinates 20a indicative of a mapping of the plurality of content regions 20 along with respective artistic or graphical images associated with each respective content region 20. Traditionally, coordinates capable of identifying every pixel of a computer display screen are determined by a manufacturer of a respective display screen and may be accessed by the mobile app for the purpose of properly displaying graphics, text, and the like upon the screen. For example, content region "01" may start at X, Y coordinates 12, 14 (these numbers are provided by way of example only) and a user may have selected an artistic image having the identifier "19". The numerical image data 13c may also be stored in the database in memory 13. At least this identifying data (12, 14, 19) may be stored in the multi-dimensional array and then called for later when access to such information is needed for use in displaying selected images at respective on-screen locations. The images themselves will be referred to with reference character 30 as explained below in greater detail.

In a critical aspect, the system 10 may include an input device such as a mouse 40 which enables a human user to interact with the display screen 14 and to make user selections by clicking the mouse button or by making on-screen selections. For the sake of clarity, both the input device and a mouse may be referred to in the present document using the reference character 40. More particularly, the processor 15 is in electronic communication with the input device so as to receive "clicks" therefrom and to be aware of the on-screen location of the mouse cursor/prompt and of the location of any graphical image so as to process such combinations according to respective programming 13a.

The plurality of graphical and artistic images 30 will now be described in greater detail. In an embodiment, a plurality of graphical and artistic images 30 may be included with the app, selectively downloaded such as by a subscription program that replenishes artistic content over time, or even uploaded by a user. The entire plurality of images 30 may be associated with each and every content region 20 and includes a means for user selection of a particular portion of the whole. More particularly, each image of the plurality of graphical and artistic images 30 may be represented by a numerical identifier such that it may be identified precisely when selected by a user for corresponding display in a respective content region 20. For instance, if an image identified as image "23" is selected for display at content region "17" and content region "17" is associated with numerical coordinates 140, 85, then an entry might be made in the multi-dimensional array as 140, 85, 17 or using a similar nomenclature. This will enable the processor 15 to actuate a display of a user selected image at a user selected position on the on-screen canvas. In an embodiment, the plurality of graphical and artistic images 30 may include an artistic swatch, a pattern, a line or plurality of lines, a paint stroke, an abstract color rendering, an artistic style, a geometric shape, a geometric pattern, an architectural structure, or the like. In one embodiment, the same plurality of images may be made available to correspond with each content region, whereas in another embodiment, a different plurality of images may be made available to one or many of the available content regions.

In another aspect, the plurality of graphical and artistic images 30 may include a starter image to be displayed initially on screen when a respective content region 20 is selected. Further, the plurality of graphical and artistic images 30 may include a plurality of alternative images 30 that are at first hidden but which may be displayed as alternatives or substituted in place of the starter image when the input device or mouse 40 is actuated/clicked. Stated another way, a user may position the mouse prompt atop a displayed image and then click the mouse button to actuate the processor 15 to cause a next numerically identified image to be displayed at the still-current content region 20. In a related aspect, a currently displayed image within a current content region 20 may be selected by operation of the mouse 40, such as by the processor 15 detecting a right-click or some other predetermined action. The system 10 may include operational controls to move the input device to a next content region 20 or the user may be given this control by traditional mouse controls. In addition, the complete on-screen canvas may be regenerated in real time upon the display screen 14 after each actuation of the mouse 40, only after the graphical image to be associated with a respective content region has been selected, or only after all of the content regions have been selected. It will be understood that references to being displayed on the display screen 14, being shared electronically on social media platforms, or being printed may be referred to generically as being "published."

Figure 3:
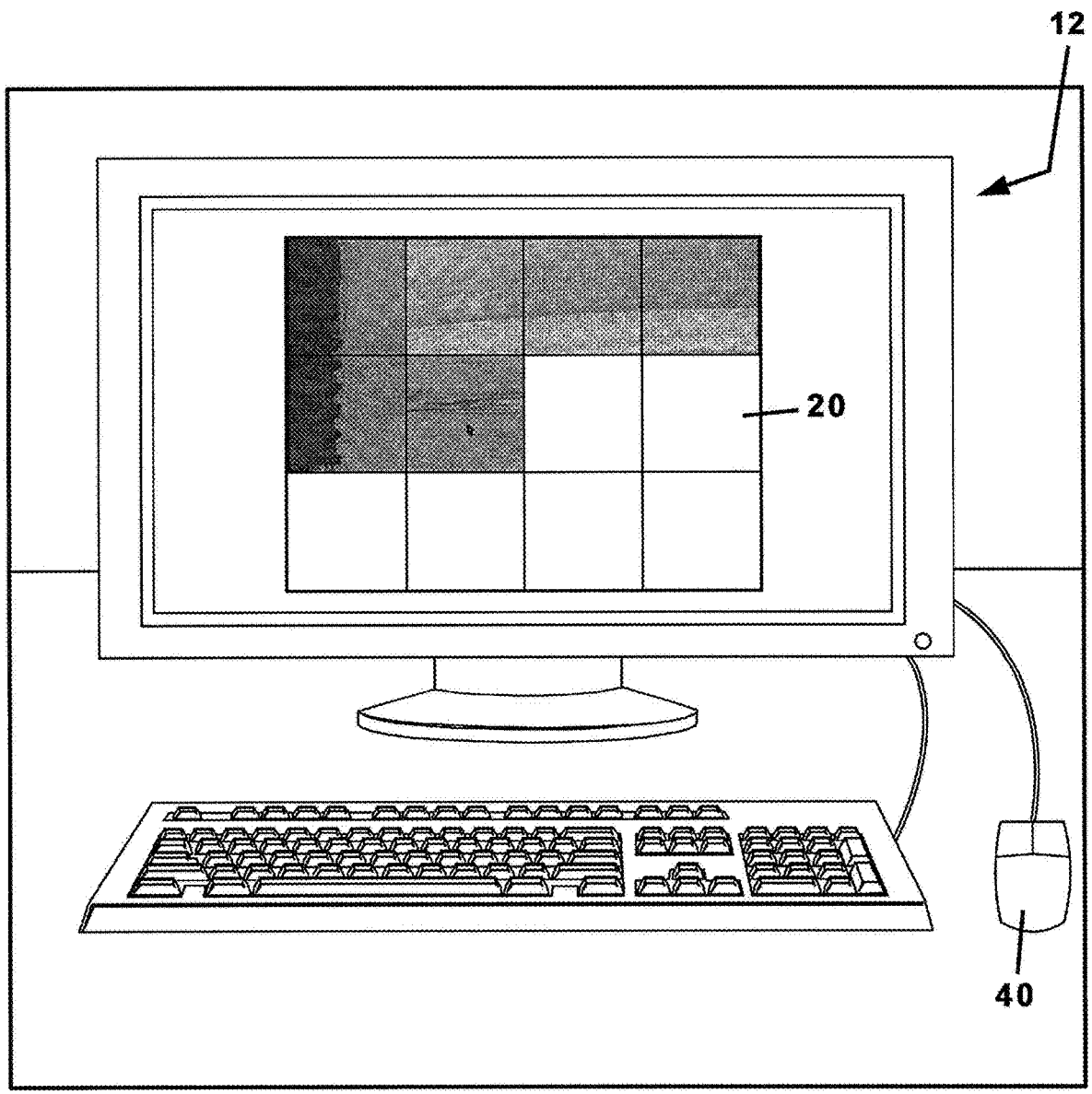
FIG. 3 is a schematic view of a partially selected canvas rendered on a computer screen.
Figure 4:
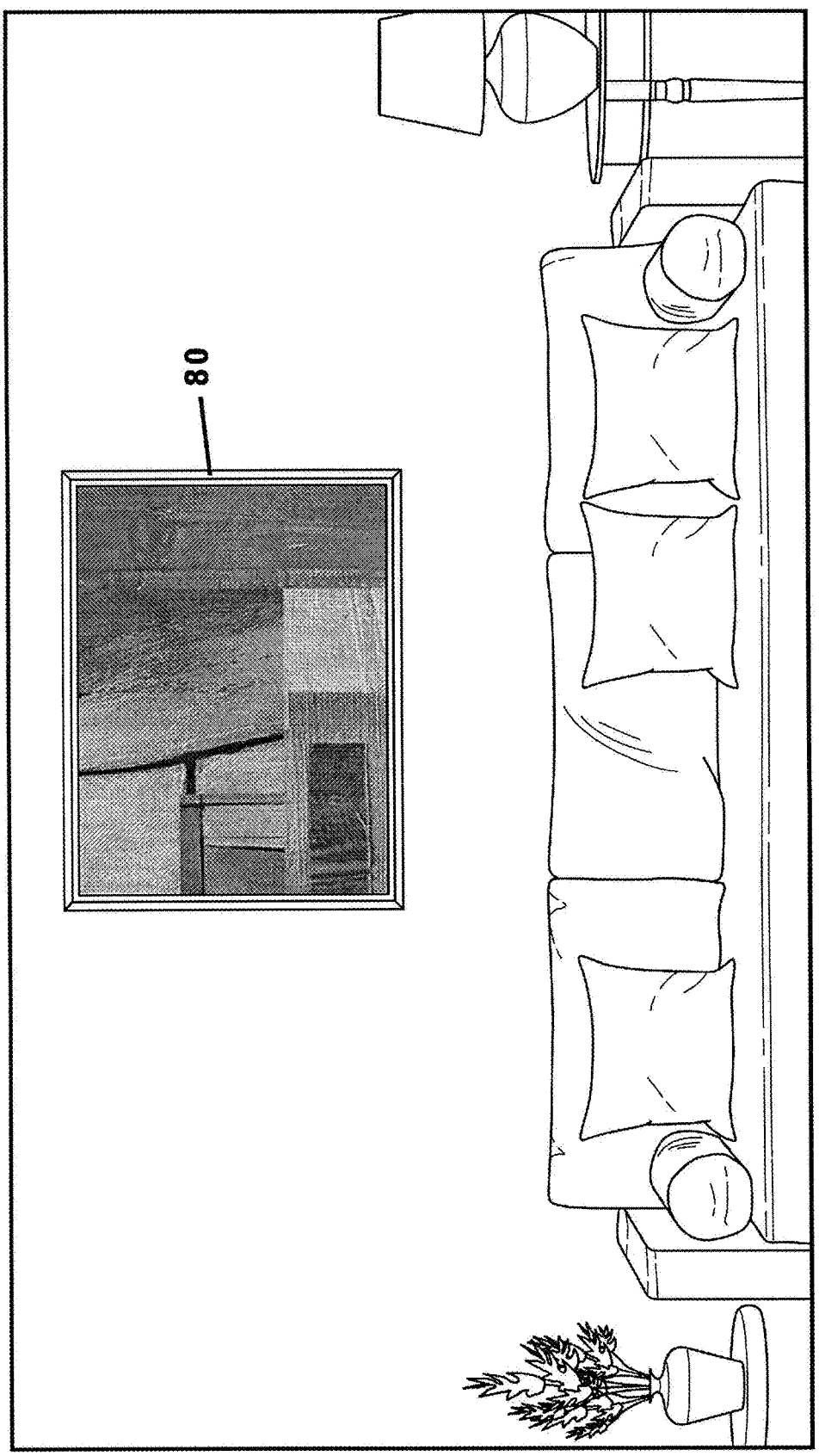
FIG. 4 is a simulated photograph of the virtual canvas having been framed and hung in a customer's living room.

It can be seen that every one of the separate and distinct content regions 20 may be "programmed" via the above-described selection process by a user or it may, alternatively, be assigned a default image such as the starter image if not otherwise manipulated. The on-screen canvas may include an input button that may be selected to indicate when the canvas is finished. Other user controls may also be provided such as controls indicative that the on-screen canvas, as defined by the multi-dimensional array, should be printed, shared (such as on social media platforms), framed, or stored electronically. A framed rendering 80 of the canvas is shown in FIG. 3. Some of these actions may require the mobile app to interact with the operating system of the computing device 12.

Figure 5:
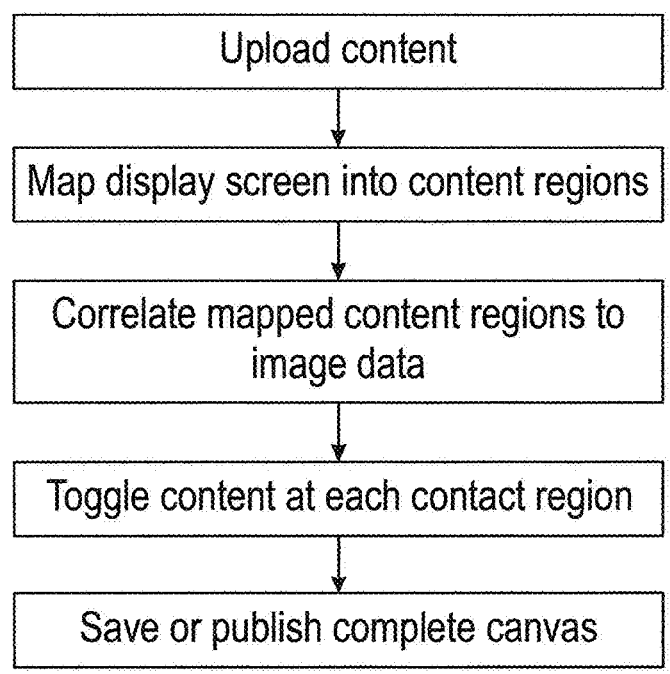
FIG. 5 is a flowchart illustrating the system and method for generating an on-screen canvas using previously submitted images according to the present invention.

A method for operation of the system 10 disclosed above can be described as follows and is shown in FIG. 5. The present invention involves a methodology for generating an on-screen canvas by receiving user selections of previously submitted graphical or artistic images 30 associated with defined content regions 20 upon a display screen 14. The display screen 14 may define a predetermined number of content regions 20 prior to a user downloading or purchasing respective application software. Then, using an input device such as a mouse 40, a user may hover over a respective content region 20 at which a starter image of a plurality of previously submitted graphical or artistic images 30 is displayed. The user may click the mouse 40 repeatedly to see alternative images until a respective image is selected for display at the then-current content region 20. As indicated above, the selected content region 20 and selected image 30 may be represented numerically in a multi-dimensional array. Every content region 20 may be "programmed" or "painted" in this manner until the entire canvas has been completed. The method may include printing, sharing, framing, or saving a completed canvas to accompanying peripheral devices such as a printer, an external memory device, or may even be shared electronically to social media platforms via an Internet connection.

It is understood that while certain forms of this invention have been illustrated and described, it is not limited thereto except insofar as such limitations are included in the following claims and allowable functional equivalents thereof.

The invention claimed is:

1. A system for generating an on-screen canvas using user selections of graphical or artistic images, comprising:
  a computing device having a display screen that includes a graphical user interface (GUI) configured to define a plurality of content regions thereon,
  said computing device including a processor in electronic communication with a non-volatile memory;
  a database stored in said memory having a multi-dimensional array stored in said memory that includes (1) a plurality of numerical coordinates indicative of a mapping of said plurality of content regions, respectively, that are each mutually distinct from one another, and (2) a plurality of graphical images associated with each content region, respectively;
  wherein a different plurality of graphical images is associated with at least one of said plurality of content regions, respectively; and
  an input device in electronic communication with said processor of said computing device that is operable to selectively toggle through said plurality of graphical images associated with said selected content region and make user selections indicative of a respective content region and of a respective graphical image selected exclusively from said plurality of graphical images associated with said selected content region.

2. The system as in claim 1, wherein:
  each content region is identified by numerical coordinates representing a location on the display screen; and
  each graphical image is identified by a numerical identifier.

3. The system as in claim 2, wherein each user selection includes an identifier of a selected content region and a selected graphical image to be associated with said selected content region.

4. The system as in claim 1, wherein said input device is a mouse.

5. The system as in claim 4, wherein said plurality of graphical images associated with a respective content region each includes a starter image and a plurality of alternative images associated with said starter image configured to be displayed at a selected content region when said input device is actuated.

6. The system as in claim 5, wherein:
  said processor is configured to determine which image of said plurality of alternative images has been selected within a respective content region; and said processor is configured to display said selected alternative image at said respective content region of said display screen.

7. The system as in claim 1, wherein said processor is configured to automatically move said input device to a next content region after a respective user selection has been made.

8. The system as in claim 1, wherein said plurality of graphical images are taken from a group comprising an artistic swatch, a pattern, a line, a paint stroke, an abstract color rendering, or an artistic style.

9. The system as in claim 1, wherein said graphical user interface is operable to divide said display screen into 4, 8, 16, 48, or 64 content regions.

10. The system as in claim 1, wherein said plurality of content regions and said user selections corresponding to said plurality of content regions, respectively, when completed, comprise the on-screen canvas in a printable format.

11. A method for generating an on-screen canvas using user selections of graphical or artistic images associated with defined regions, comprising:
  providing a display screen that defines a plurality of content regions, each being separate and distinct from one another;
  providing a plurality of graphical images corresponding to each content region, respectively, wherein a different plurality of images is associated with at least one contact region than with any other contact region;
  receiving a plurality of user selections from an input device that is configured to toggle through said plurality of graphical images that are associated with a respective content region when actuated, each user selection including a content region identifier and graphical image identifier;
  wherein each content region and each graphical image are represented numerically and stored in a multi-dimensional array; and
  displaying in real time said plurality of content regions along with respective graphical images corresponding therewith, respectively, on said display screen.

12. The method as in claim 11, wherein said input device is a mouse.

13. The method as in claim 11, wherein:
  each content region is identified by numerical coordinates representing a location on the display screen; and
  each graphical image is identified by a numerical identifier.

14. The method as in claim 13, wherein said plurality of graphical images each includes a starter image and a plurality of alternative images configured to be displayed at a selected content region when selected via said input device.

15. The method as in claim 14, further comprising:
  determining which image of said plurality of alternative images has been selected within a respective content region; and
  displaying said selected alternative image at said respective content region of said display screen.

16. The method as in claim 15, further comprising automatically moving said input device to a next content region after a respective user selection has been completed.

17. A system for generating an on-screen canvas using user selections of graphical or artistic images, comprising:
  a computing device having a display screen that includes a graphical user interface (GUI) configured to define a plurality of content regions thereon, said computing device including a processor in electronic communication with a non-volatile memory;
  a database stored in said memory having a multi-dimensional array stored in said memory that includes (1) a plurality of numerical coordinates indicative of pixel locations on said display screen of said plurality of content regions, respectively, and (2) a plurality of graphical images associated with each content region, respectively;
  an input device in electronic communication with said processor of said computing device that is configured to toggle through said plurality of graphical images when actuated so as to determine a plurality of user selections, each user selection being indicative of a respective content region and a respective graphical image to correspond to said respective content region;
  wherein said plurality of graphical images includes at least one library of images that is different than a library of images associated with another respective content region;
  wherein said plurality of graphical images includes a starter image and a plurality of alternative images configured to be displayed at a selected content region when actuated by said input device;
  wherein said processor is configured to:
    determine which image of said plurality of alternative images has been selected within a respective content region;
    publish the on-screen canvas on said display screen in real time as each user selection is made via said input device.

18. The system as in claim 17, wherein said processor is in data communication with the Internet and is configured to share the on-screen canvas to at least one social media platform.

19. The system as in claim 17, wherein said processor is operable to actuate peripheral devices to store and print the on-screen canvas, respectively.

20. The system as in claim 17, wherein said input device is a mouse.

* * * * *